(12) United States Patent
Lipscomb et al.

(10) Patent No.: US 8,931,932 B2
(45) Date of Patent: Jan. 13, 2015

(54) MOISTURE RELEASE VALVE FOR AN OUTDOOR LIGHT FIXTURE

(75) Inventors: John M. Lipscomb, Cedarburg, WI (US); Keith H. Hamm, Oshkosh, WI (US); Stanley L. Suring, Cedarburg, WI (US); Walter J. Fiedorowicz, North Prairie, WI (US); Harley A. Reabe, Green Lake, WI (US); Walter E. Frohboese, Jr., Cedarburg, WI (US)

(73) Assignees: G.H.L. International, Inc., Cedarburg, WI (US); Magnum Power Products, LLC, Berlin, WI (US)

( * ) Notice: Subject to any disclaimer, the term of this patent is extended or adjusted under 35 U.S.C. 154(b) by 1126 days.

(21) Appl. No.: 12/761,699

(22) Filed: Apr. 16, 2010

(65) Prior Publication Data

US 2011/0255293 A1 Oct. 20, 2011

(51) Int. Cl.
| | |
|---|---|
| F21V 15/00 | (2006.01) |
| F21L 14/04 | (2006.01) |
| F21V 17/00 | (2006.01) |
| F21V 21/22 | (2006.01) |
| F21V 21/30 | (2006.01) |
| F21W 131/10 | (2006.01) |

(52) U.S. Cl.
CPC .............. *F24V 31/03* (2013.01); *F21L 14/04* (2013.01); *F21V 17/007* (2013.01); *F21V 21/22* (2013.01); *F21V 21/30* (2013.01); *F21W 2131/10* (2013.01); *Y02B 20/72* (2013.01)
USPC ............ 362/362; 362/363; 362/364; 362/373

(58) Field of Classification Search
USPC ........... 362/362, 363, 364, 373, 96, 202, 205, 362/208
See application file for complete search history.

(56) References Cited

U.S. PATENT DOCUMENTS

| | | | | |
|---|---|---|---|---|
| 4,220,981 | A * | 9/1980 | Koether | 362/486 |
| 4,272,802 | A * | 6/1981 | Steadman | 362/385 |
| 5,980,074 | A | 11/1999 | Hwang | |
| 6,254,258 | B1 * | 7/2001 | Case | 362/373 |
| 6,732,947 | B2 * | 5/2004 | McKenna | 239/99 |
| 6,883,948 | B2 * | 4/2005 | VanDuyn et al. | 362/547 |
| 7,175,297 | B2 * | 2/2007 | Hagen | 362/153.1 |
| 7,182,659 | B2 * | 2/2007 | Noda et al. | 440/89 E |

\* cited by examiner

*Primary Examiner* — Jong-Suk (James) Lee
*Assistant Examiner* — Mark Tsidulko
(74) *Attorney, Agent, or Firm* — Boyle Fredrickson S.C.

(57) ABSTRACT

A moisture release valve for an outdoor light including a valve body having a stem received in a valve guide and having a head seating with a valve seat integrally formed of part of a sidewall of a light casing of the light fixture. Valve body is gravity displaced between a closed position and an open position depending upon light fixture orientation and can include a counterweight carried by its stem interiorly disposed within the fixture helping to cause displacement of the valve body toward the desired open or closed position in response to a change in light fixture orientation. Valve body can be a rivet, such as a split rivet, and the counterweight can be a washer, such as an annular washer, having an opening generally in registry with the valve guide permitting fluid within the fixture to drain from the fixture when the valve is open.

22 Claims, 8 Drawing Sheets

MOISTURE RELEASE VALVE FOR AN OUTDOOR LIGHT FIXTURE

FIELD

The present invention is directed to a moisture release valve, a moisture release valve equipped light fixture, and moisture release valve arrangement for preventing moisture entrainment and enabling moisture drainage from a light fixture.

BACKGROUND

Outdoor lighting is designed to withstand the elements without exposing the users to potentially lethal electric power. Those skilled in the art must design products that are safe to be used in wet conditions. To that end, one important characteristic is insulating the portions of the lighting fixture that have live electrical power and heat from moisture. Consequently light fixtures that are exposed to precipitation are designed to prevent infiltration by precipitation under a variety of conditions, and to eliminate the potential for water to be collected in the interior near the live electrical conductors.

Frequently, to prevent water from entering the fixture, outdoor light fixture cases are designed to be used so that light is cast downward through an opening or a lens. For example, prior art light cases for outdoor lighting may be hemispherical or oval shaped and have an opening that is usually positioned to cast the lighting fixture's light downward. The material of the case is generally impermeable to the precipitation to prevent water from entering the cavity of the light case, which contains live electrical conductors and a light source which may be hot and susceptible to breakage when exposed to water.

However, outdoor light fixtures may also be positioned to cast light generally upwards, and may also be stored in a variety of positions. Thus, the light case can accumulate water from condensation or sources of precipitation if placed in a position that allows water to accumulate in the case. In fact, because of the inverted bowl shape of many outdoor light fixture cases, they are susceptible to water collection over a range of upward facing positions.

Importantly, outdoor lighting must withstand environmental tests administered by UL in order to obtain certain UL safety certifications. For example, UL recommends the use of draining vents for fixtures that can accumulate moisture as specified by UL1598. Fixtures without adequate drainage that accumulate excessive moisture during UL testing are rejected. Excessive moisture would be defined as moisture that could find its way into the area of the light fixture where the electrical connections are located. As part of qualification, the outdoor light fixture is exposed to a range of simulated environmental conditions to determine if the fixture can meet the requirement of infiltration by moisture. Thus, valves used to drain moisture from the light case must also resist allowing water to impinge during environmental testing.

Drain valves have been used in light fixtures exposed to the elements, such as headlamps for a vehicle, are typically complex structures, such as disclosed in U.S. Pat. No. 6,254,258, designed to vent fluid when the headlamp is on and to prevent fluid from entering when the headlamp is off by forming a vacuum seal. Other prior art light fixture have moisture control systems, such as of the type disclosed in U.S. Pat. No. 6,883,948, which have separate valve elements for intake and exhaust, and may have special diaphragms that are impermeable to moisture, but allow airflow.

However, a simple and cost-effective solution for resisting impingement of water, and draining moisture from an outdoor lighting case is missing from the prior art. What is needed is a valve that allows water to drain when the light fixture is stored or used in a variety of positions that would otherwise allow water to collect in the light case. The same valve must also resist the infiltration of water in other positions under a variety of environmental conditions. What is also needed is a valve that is economical to produce and easy to manufacture.

SUMMARY

The present invention is directed to a moisture release valve for use in outdoor lighting under a variety of conditions including exposure to elements in the form of precipitation and condensation while mounted and in storage. The present invention is also directed to a light fixture equipped with such a moisture release valve as well as a method of making such a moisture release valve, including a valve-accommodating portion integrally formed of part of a casing of the light fixture.

Such a moisture release valve includes a valve body or plunger in operable cooperation with part of the light fixture casing that is displaceable relative to the casing between an open position allowing moisture within the fixture to drain and a closed position preventing moisture from entering the fixture depending upon fixture orientation. In a preferred embodiment, the valve body includes a valve stem that can be elongate and which can be configured to provide a stop that can prevent disengagement from the casing as well as limit valve body travel in the open position. A counterweight capable of at least partially functioning as such a stop can be carried by the stem with the counterweight helping to cause the valve to open and close depending on the light fixture orientation.

Valve-accommodating portion is integrally formed from in part of the casing, such as its sidewall, in a manner that permits receipt of the valve body permitting the valve body to be displaceable between open and closed positions. Valve-accommodating portion includes an exteriorly upraised valve seat with a port formed in it that is a through-opening completely through the casing sidewall permitting insertion of the valve stem therethrough and providing a valve guide for the stem. Valve-accommodating portion can include an interiorly recessed well inside the fixture casing opposite the exteriorly upraised seat that guides or funnels fluid inside the casing toward the port when the valve is open helping increase moisture drainage. Valve seat can be generally planar or otherwise complementary to and opposed valve head seat surface that can seat against the valve seat when the valve body is disposed in the closed position.

In one preferred embodiment, the valve body is formed from a rivet, such as a split rivet, with part of the valve stem formed, such as after insertion through the valve guide, to provide a stop and/or prevent disengagement of the counterweight. In one preferred embodiment, the counterweight is annular and can be a washer with an opening in it through which the valve stem is inserted during assembly. The opening in the counterweight registers with the valve guide opening when the valve body is closed allowing moisture within the fixture to flow through the counterweight opening, through the valve guide, and out the port and draining moisture from within the light fixture. Such a counterweight can help balance or oppose the weight of the valve head helping to ensure proper that the valve body opens when opening is desired and closes when closing is desired depending upon light fixture orientation relative to gravity. Use of such a counterweight helps facilitate valve body displacement in the desired opening or closing direction at relatively shallow angles of inclination and declination during changing of the light fixture orientation.

In one moisture release valve arrangement, a plurality of valves are disposed along or adjacent opposite sides of the light fixture casing corresponding to a top side and bottom side of the fixture when disposed in an upright operating position ensuring at least one of the valves, e.g. a bottommost valve, remains open to allow moisture drainage from within the fixture. Such a moisture release valve arrangement can include a moisture release valve location positioned to ensure the valve remains open when the light fixture is disposed in a storage or transport position, such as a generally horizontal storage or transport position. In one preferred arrangement, there is a plurality of pairs, i.e., at least three, of moisture release valves constructed in accordance with the present invention having at least one valve positioned so it remains open when the light fixture is disposed in an upright operating position, at least one valve positioned so it remains open when the light fixture is disposed in a generally horizontal storage or transport position with the light facing up, and can include at least one valve position sort remains open when the light fixture is disposed in a generally horizontal storage or transport position with the light facing in a sideways direction.

The described aspects and objects of the present invention will be better appreciated and understood when considered in conjunction with the following description and the accompanying drawings. It should be understood, however, that the following description while indicating preferred embodiments of the present invention is given by way of illustration and not of limitation. Many changes and modifications may be made within the scope of the present invention without departing from the spirit thereof, and the invention includes all such modifications.

DRAWING DESCRIPTION

Preferred exemplary embodiments of the invention are illustrated in the accompanying drawings in which like reference numerals represent like parts throughout, and in which.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 1:
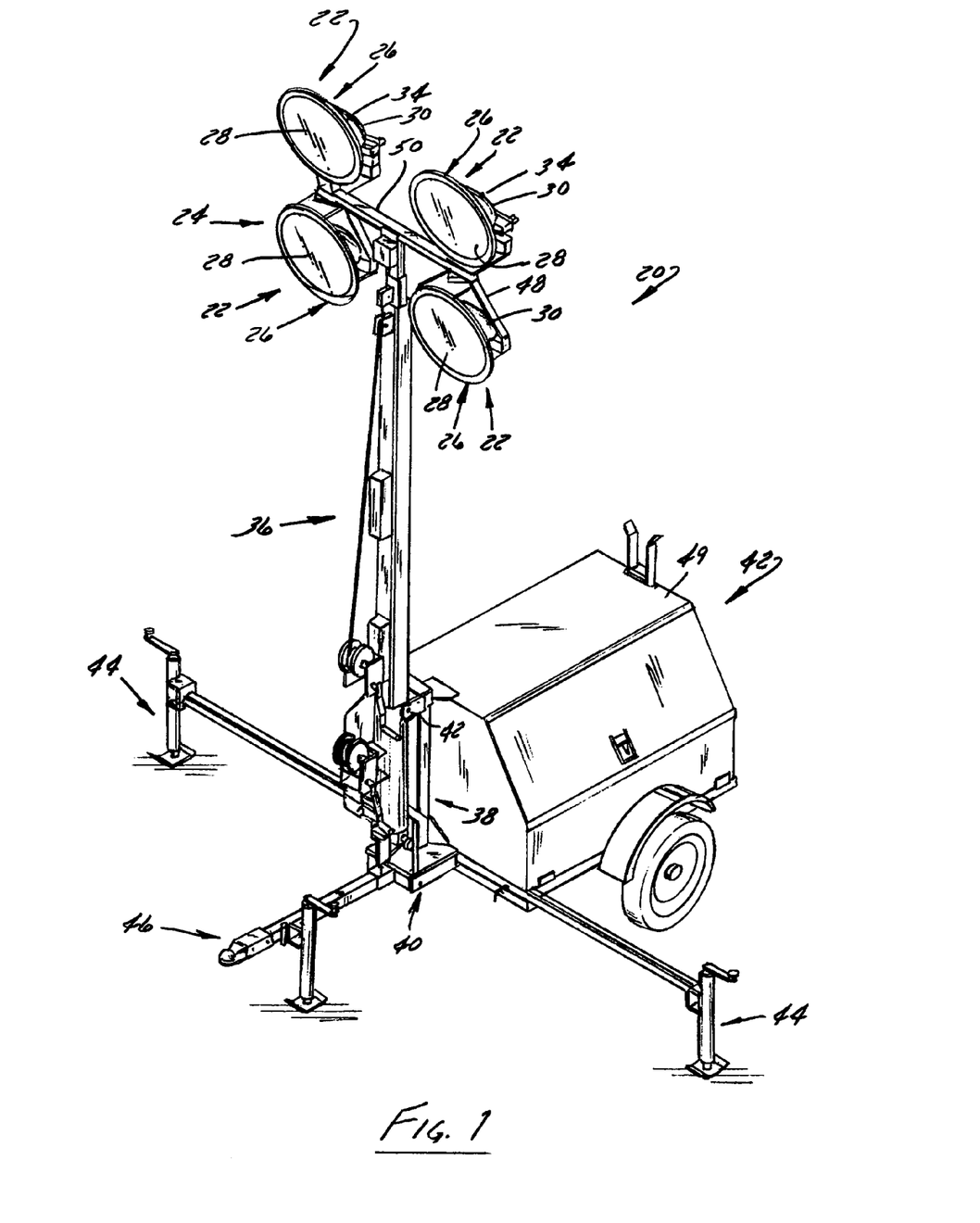
FIG. 1 is a perspective view of a portable light tower arrangement equipped with light fixtures having moisture release valves constructed in accordance with the present invention.
Figure 2:
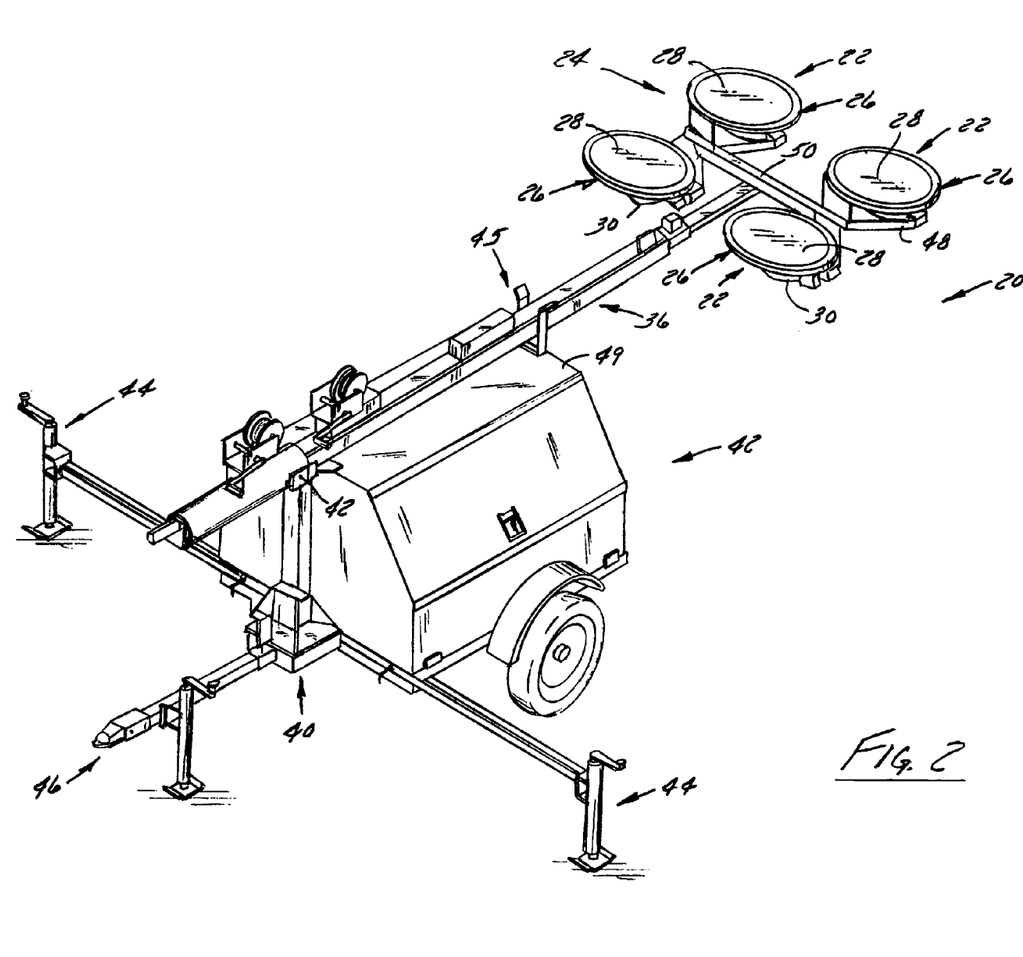
FIG. 2 is a perspective view of the portable light tower arrangement of FIG. 1 shown in a first storage or transport position.

FIGS. 1 and 2 illustrate an exemplary light tower 20 equipped with at least one and typically a plurality of lights 22 arranged in a bank 24 of lights 22 with each light 22 including a fixture 26 with a lens 28 and a casing 30 enclosing a source of light 32 (FIG. 4) inside the fixture 26 that can be a single light bulb, an array of bulbs, LEDs, or another source of light. The fixture 26 includes at least one moisture release valve 34 having a portion of the valve 34 integrally formed of part of the light fixture casing 30 that is open or closed, depending on the orientation of the light fixture 26, to permit moisture within the fixture 26 to be released.

The light tower 20 includes an upright mast 36 that can be of telescoping construction, such as is depicted in FIGS. 1 and 2. As is shown in FIG. 1, the mast 36 extends uprightly from a mount 38 that can be part of a base 40 attached to a wheeled trailer or other transport vehicle 42, such as a trailer/transport vehicle 42 equipped with a power supply. Such a power supply can be in the form of electrical charge storage devices, such as one or more batteries or the like, can be in the form of a generator, such as an internal combustion engine powered generator, or can be configured in another manner, such as with solar cells or the like, to provide electrical power to the lights 22.

The mount 38 and/or base 40 can pivotally support the mast 36 of the tower 20 in a manner that permits it to be movable between a generally upright orientation, such as the upright operating position shown in FIG. 1, and a transport or storage orientation, such as the generally horizontal storage/transport position shown in FIG. 2. To provide increased stability when the mast 36 of the tower 20 is disposed in its upright operating position, one or more removable outriggers 44 can be extended from the base 40 or another portion of the vehicle 42. Tongue 46 is also configurable, such as in the manner depicted in FIG. 1, to further help increase stability. As is shown in FIG. 2, mast 36 can be received in a cradle 45 spaced from a pivot 47 of mount 38 when disposed in the generally horizontal storage position with the cradle 45 carried by part of vehicle 42, such as a housing 49 that encloses the onboard power supply.

Figure 3:
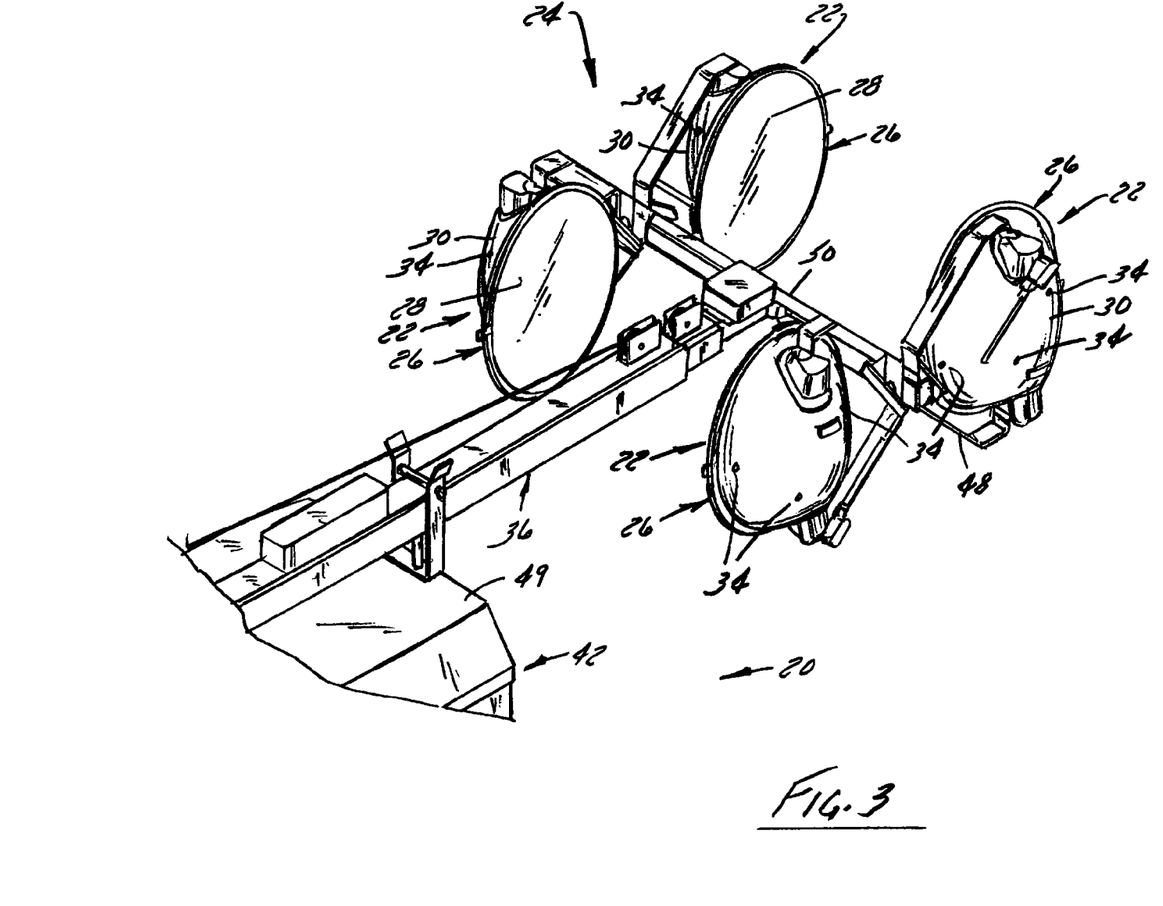
FIG. 3 is a fragmentary perspective view of the portable light tower arrangement of FIG. 1 depicted in a second storage or transport position.

Lights 22 are attached by a bracket 48 to a crossbar 50 of a carriage 52 disposed at or adjacent the end of the mast 36. Bracket 48 can be constructed and arranged to pivotally attach to opposite sides of the fixture casing 30 in a manner that can permit the angle of the light 22 to be adjusted as well as to allow pivoting of each light 22 to a storage position. For example, as is shown in FIG. 3, lights 22 can be pivoted so as to face each other when the mast 36 is oriented in the generally horizontal storage position.

Figure 4:
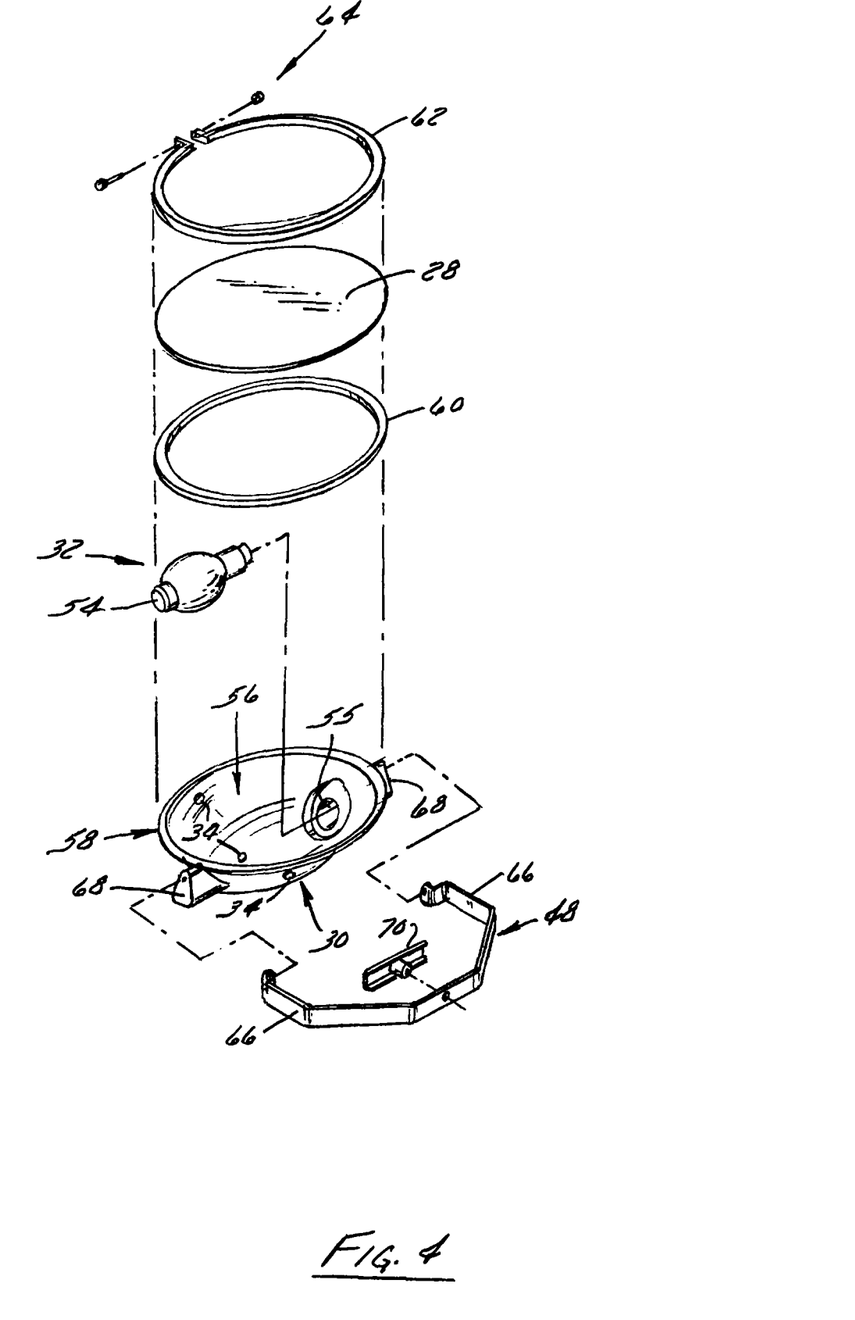
FIG. 4 is a perspective exploded view of a light fixture equipped with a moisture release valve constructed in accordance with the present invention.

FIG. 4 is an exploded view illustrating an exemplary embodiment of a light 22 that has a fixture 26 with a generally oval fixture casing 30 which receives a light source 32 that is a light bulb 54. Where the light source 32 is a light bulb 54, the casing 30 can include a socket or the like, such as the socket 55 shown in FIG. 4. The casing 30 has an opening 56 bounded by a flanged seat 58 in which a sealing gasket 60 is disposed positioning the gasket 60 between the casing 30 and lens 28. A clamping ring arrangement 62 can be used to releasably secure the lens 28 to the casing 30 using a fastener arrangement 64. Other configurations and arrangements can be employed to provide a lens seal and to attach lens 28.

Bracket 48 includes a pair of arms 66 that respectively engage an outwardly extending casing support 68, only one of which is shown in FIG. 4, such as by using one or more fasteners or the like. Casing support 68 can also be formed as or otherwise include a trunnion enabling relative rotation between bracket arms 66 and casing support 68 allowing pivotal adjustment of the light fixture 26. Casing support 68 can be a component separate from casing 30 or can be integrally formed with or of the casing 30. Bracket 48 is mountable to crossbar 50 of carriage 52 using a clamp plate 70 that attaches to the bracket 48 using a fastener or the like (not shown). Other bracket configurations and arrangements for light fixture attachment can be used.

Figure 5:
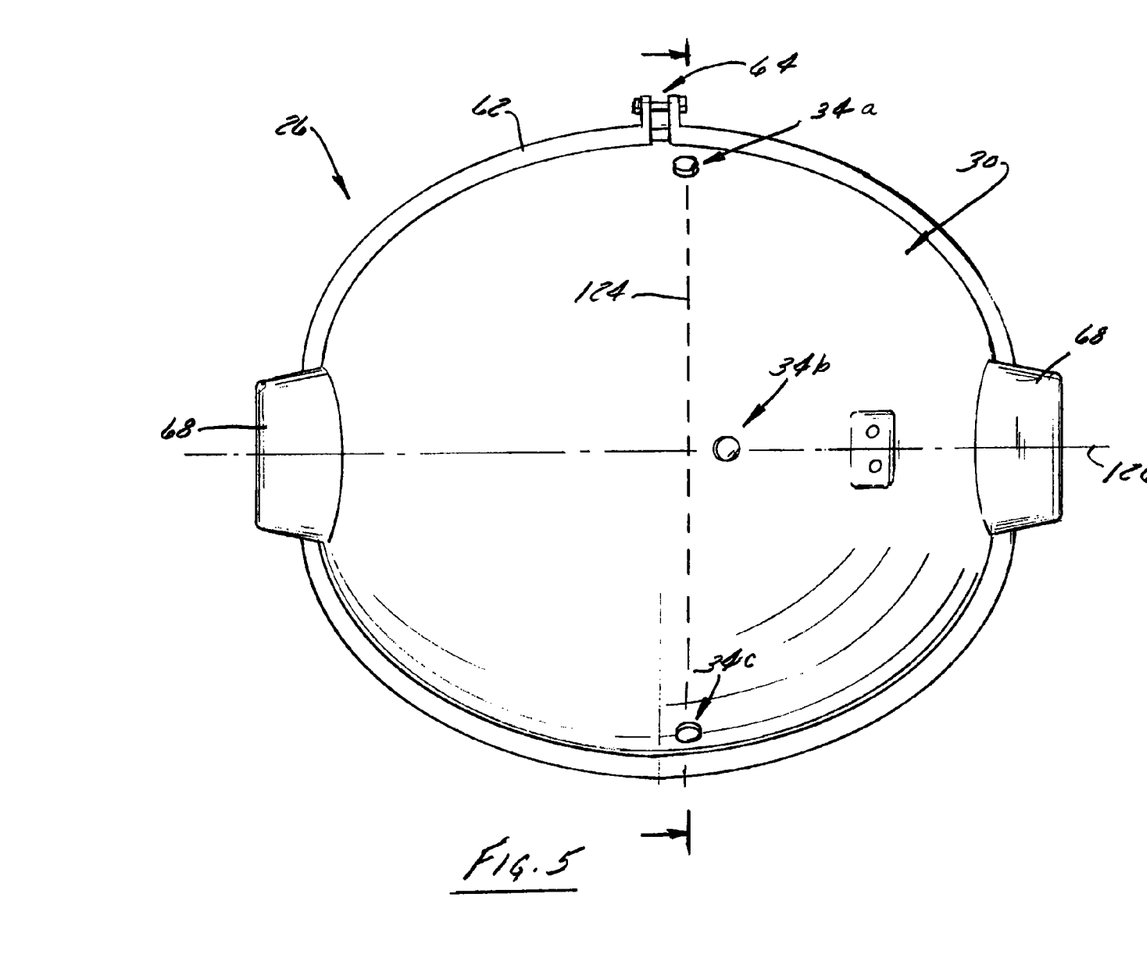
FIG. 5 is a rear plan view of a casing of the light fixture of FIG. 4 illustrating a preferred moisture release valve arrangement.

The rear of the casing 30 is shown in FIG. 5 and includes a plurality of pairs, i.e., at least three, of moisture release valves 34 constructed in accordance with the present invention to enable moisture inside a light fixture 26 to be released from the fixture 26. In a currently preferred embodiment, casing 30 is of metallic construction, such as aluminum, that is formed, such as by stamping or the like into a desired shape, such as the recessed oval-shape shown in FIGS. 1-5. As is discussed in more detail below, in at least one preferred embodiment, valve 34 is configured to enable gravity to displace it between open and closed positions thereby enabling light fixture orientation to facilitate operation of one or more of the valves 34. In addition, a light fixture 26 constructed in accordance with the present invention can be configured with an arrangement of such valves 34 located on the casing 30 so that at least one of the valves 34 always remains open no matter what the orientation of the fixture 26.

Figure 6:
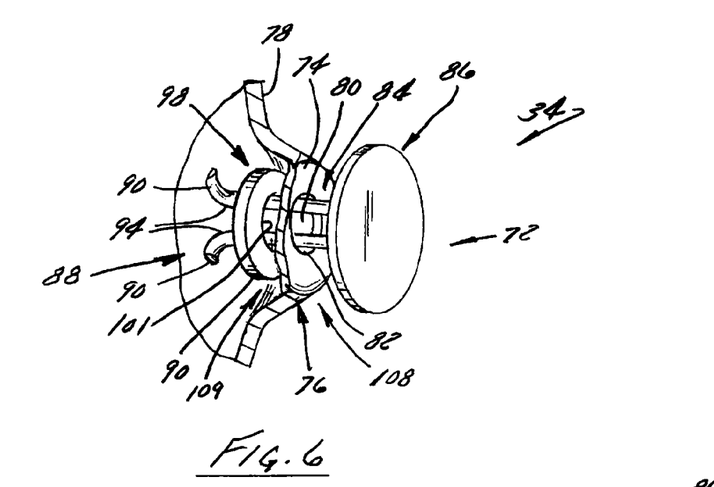
FIG. 6 is a fragmentary sectional view of a preferred moisture release valve embodiment depicting the valve in an open position.
Figure 7:
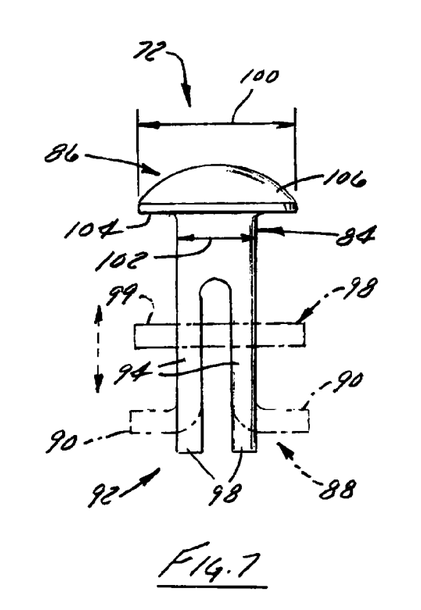
FIG. 7 is a side elevation view of one preferred valve body or valve plunger embodiment.
Figure 8:
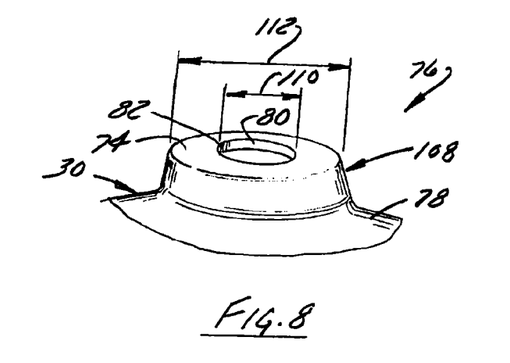
FIG. 8 is a fragmentary perspective view of a preferred embodiment of a valve-accommodating portion integrally formed of part of the light fixture casing.

FIGS. 6-8 illustrate a preferred embodiment of the moisture release valve 34 that includes a valve body or plunger 72 disposed in a valve seat 74 integrally formed of a valve-accommodating portion 76 of a sidewall 78 of the light casing 30 that includes a portion or opening 80 formed therein that serves as a valve guide 82 for an elongate valve stem 84 received through the opening 80. The valve body or plunger 72 includes an enlarged valve head 86 that abuts against the seat 74 when the valve 34 is disposed in a closed position. The valve stem 84 extends outwardly from the valve head 86 and includes or carries a stop 88 at or adjacent its free end that prevents removal of the valve body or plunger 72 from the valve guide 82.

FIG. 7 illustrates in more detail one preferred embodiment of the valve body or plunger 72. As previously discussed, the valve body or plunger 72 includes an enlarged head 86 from which outwardly extends an elongate stem 84. As is shown in phantom in FIG. 7, a portion 90 of the stem 84 can be formed in a manner that prevents removal of the valve body or plunger 72 from the valve guide 82. As is discussed in more detail below, a counterweight 98, such as a washer 99 that can be of annular or disc-shaped and metallic construction, can be carried by the stem 84. Where the counterweight 98 is a washer 99, the hole 101 in the washer 99 not only facilitates assembly to the valve body or plunger 72, but also helps enable moisture in the light fixture 26 to drain when the valve 34 is opened. As indicated by reference numeral 106, the valve head 86 can have a rounded or convex outer surface as this can help repel moisture contacting the head 86 away from the head 86. As indicated by reference numeral 100, valve head 86 has a width or diameter greater than the width or diameter of the valve stem 84 indicated at reference numeral 102, producing a valve head seating surface 104 that extends outwardly of the stem 84.

In a preferred embodiment, the valve body or plunger 72 is formed of a rivet that can be a split rivet 92 the same as or like that shown in FIG. 7 with the head of the split rivet 92 forming the valve head 86 and the shank of the split rivet 92 forming a valve stem 84 that can be of bifurcated construction having a pair of generally parallel and spaced apart valve stem legs 94. Split rivet 92 can be of metallic construction. As is shown in phantom in FIG. 7, each valve stem leg 94 can be formed, such as after insertion through the opening 80 in the valve guide 82, to produce an outturned portion 90 at or adjacent the free end 96 of each leg 94. While each outturned portion 90 of each leg 94 of the valve stem 84 can serve as the stop 88 that prevents removal of the valve body or plunger 72, it can also prevent removal of a counterweight 98 carried by the stem 84 that facilitates closing and/or opening of the valve 34 depending upon the orientation of the valve 34. Where equipped with such a counterweight 98, counterweight 98 can serve as stop 88 and can be movable, e.g., slidable, along the stem 84.

FIG. 8 illustrates one preferred embodiment of a valve-accommodating portion 76 that is integrally formed of part of the sidewall 78 of the light casing 30. In a preferred method of making the valve-accommodating portion 76, an exteriorly upraised dimple 108 is formed in the sidewall 78 in a forming operation such as by using a press, such as a stamping press, or a punch. Such an exteriorly upraised dimple 108 forms an interiorly recessed well 109 (FIG. 6) within the light casing 30 that encourages accumulation of fluid when the fixture 26 is oriented in a manner that opens valve 34. During the forming operation used to create the dimple 108, the opening 80 that defines valve guide 82 can also be formed. If desired, opening 80 can be formed in a separate operation. Opening 80 is a through-opening that extends completely through the casing sidewall 78 and can be centered in or on the dimple 108 so as to provide a fluid-flow drainage port in fluid-flow communication with well 109. As indicated by reference numeral 110, opening 80 has a width or diameter greater than the width or diameter of the valve stem 84.

The fixture, punch or die used in the forming operation can be configured to impart a valve seating surface 74 that can be of generally flat construction and that extends around opening 80. For example, as is shown in FIG. 8, valve seating surface 74 is generally annular and generally flat so as to be generally complementary with the seating surface 104 of the valve head 86 in a manner that better prevents water infiltration when the valve head 86 is seated. As indicated by reference numeral 112, the valve seating surface 74 has a width or diameter greater than that of the opening 80 and that can range from less than the width or diameter of the valve head 86 to greater than the valve head width or diameter.

Figure 9:
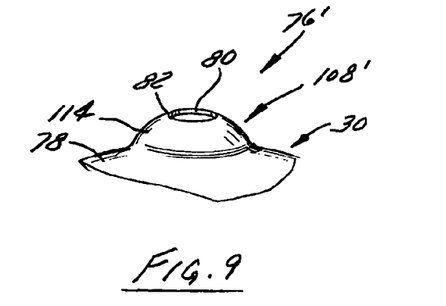
FIG. 9 is a fragmentary perspective view of another embodiment of a valve-accommodating portion.

FIG. 9 illustrates another embodiment of a valve-accommodating portion 76' integrally formed of part of the light casing sidewall 78 using a forming operation, such as a press, a punch, or the like that forms a dimple 108' having a generally convex outer surface 114 against which at least a portion of the valve head seating surface 104 seats against when the valve 34 is closed. Opening 80 can be formed substantially simultaneously with the formation of dimple 108' or can be formed in a separate operation.

Figure 10:
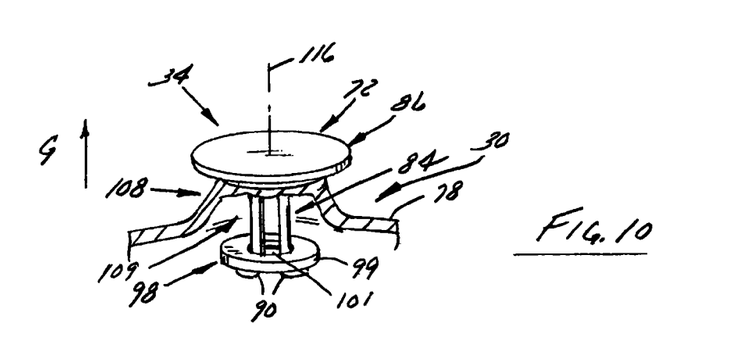
FIG. 10 is a fragmentary sectional view of the moisture release valve of FIG. 6 in a fully open position.
Figure 11:
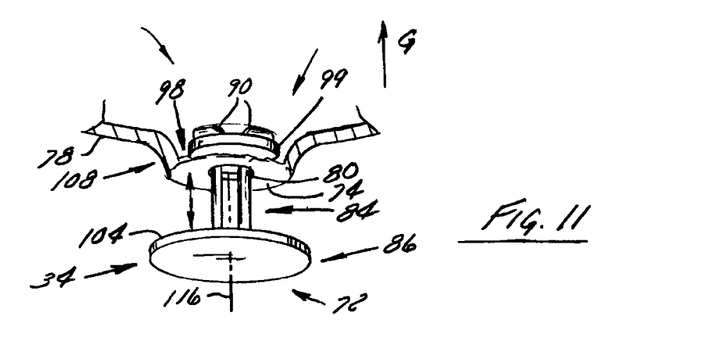
FIG. 11 is a fragmentary sectional view of the moisture release valve of FIG. 6 in a fully closed position.

FIGS. 10 and 11 respectively depict the valve 34 closed and open. FIG. 10 illustrates the valve body or plunger 72 in a closed position with its seating surface 104 seated on the valve seat 74 of the integrally formed valve-accommodating portion 76. FIG. 11 illustrates the valve body or plunger 72 in an open position such that its seating surface 104 is spaced a sufficient distance away from the valve seat 74 to allow drainage of water within the light fixture 26 out opening 80. In FIG. 11, valve 34 is fully open with the stop 88 formed by counterweight 98 abutting against an interior surface of a recessed part of the valve-accommodating portion 76 formed in the light casing sidewall 78. More specifically, counterweight 98 abuts against part of the interior surface of the light casing sidewall 78 when the valve body or plunger 72 is disposed in the fully open position, such as the fully open position shown in FIG. 11. When the counterweight 98 abuts against the interior of the light casing sidewall 78 when the valve 34 is fully open, opening 101 in the counterweight 98 generally overlies casing sidewall opening 80 enabling water to pass through both openings 101 and 80 when draining from the fixture 26.

Valve 34 closes when the light fixture 26 is oriented in a manner that positions the valve body or plunger 72 with its head 86 facing generally upwardly and a longitudinal axis 116 of the body or plunger 72 inclined at an angle relative to gravity, G, or vertical that is sufficiently acute or substantially the same causing gravity acting on the valve body or plunger 72 and/or counterweight 98 to displace the valve body or plunger 72 relative to the light casing sidewall 78 to its fully closed position. Conversely, valve 34 opens when the light fixture 26 is oriented in a manner that positions the valve head 86 so it faces generally outwardly and inclines the longitudinal axis 116 of the body or plunger 72 at an angle relative to gravity, G, or vertical that is sufficiently acute or the same causing gravity acting on the valve body or plunger 72 and/or counterweight 98 to displace the valve body or plunger 72 relative to the light casing sidewall 78 away from its fully closed position and toward an open position where the opening is sufficiently unobstructed that moisture in the fixture 26 can drain out the fixture 26.

Counterweight 98 is carried by valve stem legs 94 with the legs 94 extending through opening 101 such that counterweight 98 is movable relative to valve stem legs 94 during valve operation. As a result of being movable relative to the valve stem legs 94, counterweight 98 is able to move relative to the valve body or plunger 72 in response to a change in orientation of the fixture 26 helping to ensure that the valve 34 properly opens and closes in response to such a change in light fixture orientation. In addition, the counterweight 98 helps offset any bending moment and/or frictional engagement created by the weight of the valve head 86 during a change in light fixture orientation that would ordinarily otherwise cause the stem 84 to hang up in the valve guide 82 tending to prevent the valve 34 from closing when it is supposed to close and from opening when it is supposed open. Counterweight 98 also helps keep valve 34 open during a greater range of angular change in light fixture orientation when the orientation of the light fixture 26 is being changed in a direction that would ordinarily tend to cause the valve 34 to close. The same is true regarding the role of the counterweight 98 in helping to keep the valve 34 closed during a greater range of angular change in light fixture orientation when the orientation of the light fixture 26 is being changed in a direction that would ordinarily tend to cause the valve 34 to open.

Figure 12:
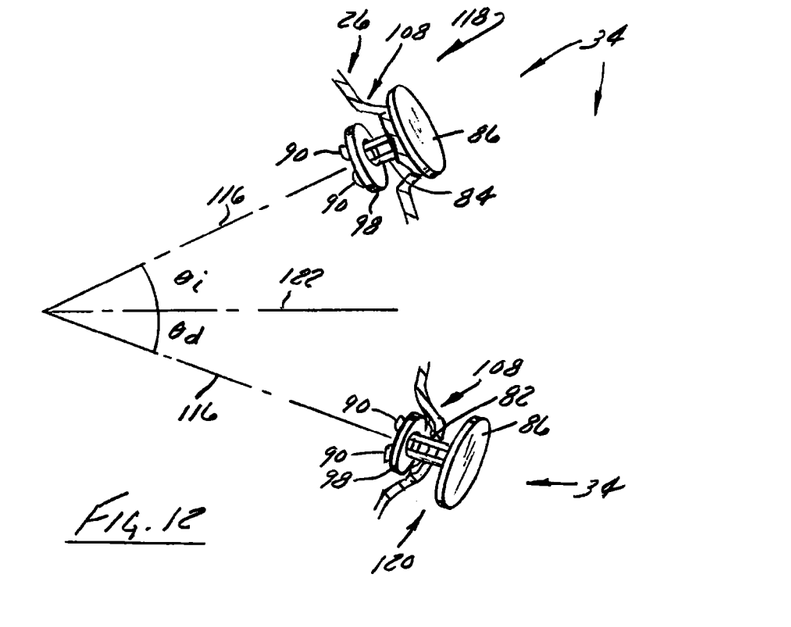
FIG. 12 shows a pair of partial fragmentary sectional views of the moisture release valve of FIG. 6 in different orientations relative to horizontal.

FIG. 12 provides an example illustrating this in more detail. As fixture 26 is pivoted between a generally upwardly disposed position 118 where valve 34 is closed and a generally downwardly disposed position 120 where valve 34 is open, counterweight 98 cooperates with the valve body or plunger 72 to help facilitate proper opening and closing of valve 34. Proper closing of valve 34 is desired to prevent water from outside the fixture 26 from passing through opening 80 and getting into fixture 26 when the fixture 26 is oriented at an angle that would tend to expose it to rain. Conversely, proper opening of valve 34 is desired to allow water from inside the fixture 26 to drain from the fixture 26 through opening 80 when the fixture 26 is oriented at an angle that causes moisture in the fixture 26 to flow towards the opening 80.

As fixture 26 is pivoted or rotated downwardly from such an upwardly disposed position, e.g., position 118, in a manner that causes its angle of inclination, $\theta_i$, relative to the longitudinal valve axis 116 to decrease relative to a generally horizontal line or plane 122, counterweight 98 offsets a force acting on the valve head 86 tending to open the valve 34 thereby opening when a suitable relatively shallow acute angle of declination, $\theta_d$, of between about 15° and about 45° below horizontal is reached. At that point, the force(s) tending to displace the valve body or plunger 72 toward its open position also acts upon counterweight 98 in like manner allowing the valve body or plunger 72 to move toward an open position, causing the valve 34 to open when it is supposed to open. In one embodiment, opening starts to occur at a relatively shallow angle of declination, $\theta_d$, of no greater than 35° below horizontal 122.

As fixture 26 is pivoted or rotated upwardly from such a downwardly disposed position, e.g. position 120, the force of gravity acting on the weight of the valve head 86 when the valve body or plunger 72 is outwardly extended in an open position tends to oppose movement of the valve body or plunger 72 towards the closed position. This can be caused by the resultant moment created by gravity acting on the head 86 increasing frictional engagement between part of the valve stem 84 and the valve guide 82 to a point that the valve body or plunger 72 can essentially become stuck or hung up in the open position. Counterweight 98 can help prevent the valve body or plunger 72 from becoming stuck or hung up as a result of gravity acting on counterweight 98 to create an opposing force.

As the angle of declination, $\theta_d$, decreases, the moment created by force acting on the valve head 86 decreases while the force acting on the counterweight 98 tending to want to close the valve 34 increases. At some point during upward pivotal or rotational movement, counterweight force overcomes the force of frictional engagement, e.g., static friction, between the stem 84 and valve guide 82 breaking the valve body or plunger 72 free thereby allowing it to move towards the closed position. In one preferred embodiment, this transition occurs when the angle of declination, $\theta_d$, becomes an angle of inclination, $\theta_i$ of between about 15° and about 45° relative to horizontal 122 such that valve closing begins to occur. In one embodiment, closing begins to occur when the angle of inclination, $\theta_i$, is no greater than 30° above horizontal 122.

Figure 13:
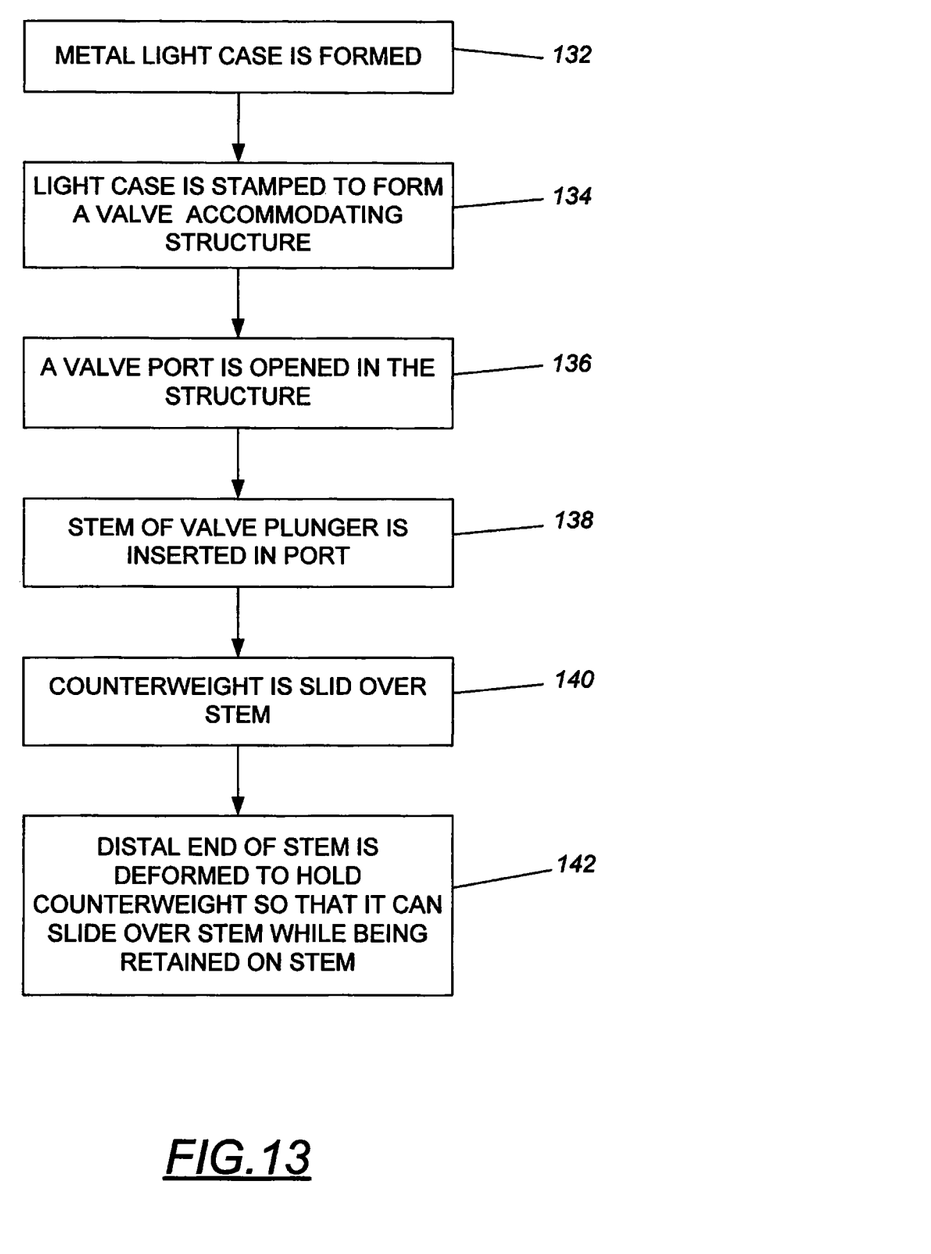
FIG. 13 is a diagram depicting a method of making a fixture equipped with a moisture release valve constructed in accordance with the present invention.

FIG. 5 also illustrates a preferred moisture release valve arrangement 125 having a fixture 26 with a plurality of pairs of valves 34a, 34b and 34c positioned on the casing 30 relative to central transverse and longitudinal axes 124, 126 of the fixture 26 so that at least one valve 34a, 34b and 34c remains open when the fixture 26 is disposed in an upright orientation and when the fixture 26 is disposed in a storage orientation. In the oval light fixture embodiment shown in FIGS. 13-15, one of the valves 34a is disposed adjacent central transverse axis 124 and adjacent one outer edge 128 of the casing 30 thereby allowing moisture to drain from the fixture 26 when angle of the fixture 26 positions the valve 34a at an angle of declination below horizontal. Another one of the valves 34b is disposed adjacent an intersection between the central transverse and longitudinal fixture axes 124, 126 and can be disposed adjacent to or on one or both of the axes 124, 126 opening when the fixture 26 is oriented with the casing 30 facing downwardly generally towards the ground. A still further one of the valves 34c is disposed adjacent central transverse axis 124 and adjacent an opposite outer edge 130 of the casing thereby allowing moisture to drain from the fixture 26 when angle of the fixture 26 positions the valve 34a at an angle of declination below horizontal.

Referring once again to FIGS. 1-3, such a valve arrangement 125 permits one of the valves, such as valve 34c, of each light 22 to remain open when the lights 22 are disposed uprightly in an operating position, such as the operating position shown in FIG. 1. This can help prevent pressure buildup within the fixture 26 during light operation. Such a valve arrangement 125 further permits at least one other valve, such as valve 34b, to remain open when the lights 22 are disposed in the upwardly facing generally horizontal storage or transport position shown in FIG. 2. Such a valve arrangement 125 still further permits at least one valve, such as valve 34a or 34c, to remain open when the lights 22 are disposed in the generally horizontal storage or transport position shown in the sideways facing generally horizontal storage or transport position shown in FIG. 3.

Such a moisture release valve arrangement 125 can be used with light fixtures having a shape that differs from oval. For example, moisture release valve arrangement 125 can be used with a generally rectangular light fixture that can be generally square if desired. In addition, moisture release valve arrangement 125 can also be used with a generally circular light fixture. Where such a generally circular light fixture has a light socket or connection located at or adjacent the center of its casing, moisture release valve arrangement 125 can be modified to include only valves 34a and 34c positioned at or adjacent opposite outer edges of the circular casing so they are respectively located at or adjacent a top and bottom of the fixture when disposed in an upright operating position.

One preferred method of making a fixture with one or more moisture release valves 34 constructed in accordance with the present invention is depicted in FIG. 12. First, a metal light case 30 is formed in a forming step 132. For example, in one preferred implementation of a method of making such a fixture in accordance with the present invention, a sheet of metal, such as a sheet of aluminum or the like, is three-dimensionally contoured in a forming operation, such as by drawing, spinning, stamping or the like, into the desired oval, rectangular, or circular light case shape. With reference to reference numeral 134, as part of this forming step or in a separate forming operation, a valve-accommodating structure 108 is formed in the sidewall 78 of the case 30. With reference to reference numeral 136, valve-accommodating structure 108 includes a valve port or opening 80 that can be formed separately from or during forming of the valve-accommodating structure 108. A stem 84 of a valve plunger or body 72 is inserted into the valve port or opening 80 in step 138. Counterweight 98 is attached to the stem 84 in step 140, such as by inserting the stem 84 through the opening 101 in the counterweight 98. Thereafter, stem 84 is formed to retain the counterweight 98 in step 142. In one preferred implementation, a split rivet is used as the valve body or plunger and has a plurality of valve stem legs 94 that each can be formed at or adjacent its distal end in a manner that holds counterweight 98 but permits the counterweight 98 to slide along stem 84 during valve operation.

There are many possible variations contemplated regarding the construction of valve 34. For example, counterweight 98 can be a washer or any other element of sufficient weight or mass having an opening 101 for receiving the valve stem 84 wherein the resulting assembly allows the weight 98 to slide along the stem 84. Where the counterweight 98 is a washer, it can be made of aluminum, of steel, such as nickel-plated steel, or of another suitable material. Similarly, the valve body or plunger 72 can be made of any number of suitable materials, including aluminum, steel, and alloys thereof. Finally, valve seat 72 can be substantially flat, rounded, or otherwise shaped in a manner that can be generally complementary with seating surface 104 of valve head 86. Valve seat 72 can be hard-faced if desired.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A light fixture moisture release valve assembly comprising a valve body movable between a closed position and an open position disposed from the closed position with the valve body comprised of a valve stem slidably received in and slidably guided by a valve guide defined by an opening integrally formed in the light fixture and a valve head carried by the valve stem that seats against a valve seat integrally formed of the light fixture when the valve body is disposed in the closed position, wherein the valve body is movable relative to the light fixture between the closed position and an open position disposed from the closed position where the valve head unseats from the valve seat causing the valve guide opening to function as a drainage port though which liquid inside the light fixture drains from the light fixture, wherein the light fixture comprises a light fixture case and wherein the valve guide opening and the valve seat are integrally formed of a portion of the light fixture case, and wherein the head is disposed exteriorly of the light fixture case and further comprising a counterweight disposed interiorly of the light fixture casing that is carried by the valve body.

2. The valve assembly of claim 1 wherein the light fixture case comprises a holder for a source of light and wherein the light fixture case is carried by an elongate mast of a wheeled trailer or transport vehicle.

3. The valve assembly of claim 1 wherein the valve seat comprises an exteriorly upraised dimple formed of a portion of a sidewall of the light fixture case.

4. The valve assembly of claim 3 wherein the exteriorly upraised dimple forms an interiorly recessed moisture-accumulating well inside the light fixture case opposite the valve seat.

5. The valve assembly of claim 1 wherein the counterweight has a hole through which fluid can flow when the valve is open.

6. The valve assembly of claim 5 wherein the counterweight comprises an annular washer.

7. The valve assembly of claim 1 wherein the counterweight has a hole through which the valve stem extends.

8. The valve assembly of claim 7 wherein the counterweight is movable relative to the valve stem during movement of the valve body toward or away from one of an open position and the closed position.

9. The valve assembly of claim 1 wherein the counterweight comprises a stop that prevents disengagement of the valve body from the light fixture case.

10. A light fixture moisture release valve assembly comprising a valve body movable between a closed position and an open position disposed from the closed position with the valve body comprised of a valve stem slidably received in and slidably guided by a valve guide defined by an opening formed in the light fixture and a valve head carried by the valve stem that seats against a valve seat formed of the light fixture when the valve body is disposed in the closed position, wherein the valve body is movable relative to the light fixture between the closed position and an open position disposed from the closed position where the valve head unseats from the valve seat causing the valve guide opening to function as a drainage port though which liquid inside the light fixture drains from the light fixture, and wherein the valve body comprises a rivet.

11. The valve assembly of claim 10 further comprising a washer carried by the rivet that is movable relative to the rivet.

12. The valve assembly of claim 11 wherein the rivet comprises a split rivet having a plurality of valve stem legs each received through an opening in the washer allowing slidable relative movement between the washer and the valve stem.

13. The valve assembly of claim 12 wherein the light fixture comprises a light fixture case and wherein the valve guide and valve seat are integrally formed of a portion of a sidewall of the light fixture case with the valve head disposed on one side of the sidewall of the light fixture case and the washer disposed on an opposite of the sidewall of the light fixture case.

14. The valve assembly of claim 13 wherein the washer comprises a counterweight.

15. A light fixture moisture release valve assembly comprising:
a light fixture case having a valve seat integrally formed of a portion of a sidewall of the light fixture case with the valve seat having a valve guide opening formed therein extending through the light fixture sidewall;
a valve body comprised of (a) a valve stem received in the valve guide that is axially movable relative to the valve guide in being guided by the valve guide, and (b) a valve head attached to the valve stem with the valve head disposed on one side of the light fixture case sidewall and wherein the valve body is movable relative to the light fixture case sidewall between a closed position where the valve head seats against the valve seat and an open position disposed from the closed position where the valve head is spaced from the valve seat; and
a counterweight slidably carried by the valve stem and disposed on a side of the light fixture case sidewall opposite the valve head.

16. The valve assembly of claim 15 wherein the valve seat is comprised of a dimple formed in the light fixture case sidewall and the valve guide opening comprises a through-opening extending through the dimple.

17. The valve assembly of claim 15 wherein the counterweight has an opening through which the valve stem extends permitting relative movement between the counterweight and the valve stem and allowing moisture to flow through the opening.

18. The valve assembly of claim 15 wherein the valve body comprises a rivet and the counterweight comprises a washer slidably carried by the valve stem permitting relative movement therebetween.

19. A light fixture moisture release valve assembly comprising:
a light fixture having a light fixture case with a valve seat integrally formed of a portion of a sidewall of the light fixture case with the valve seat having a valve guide comprised of an opening formed therein that extends completely through the sidewall defining a moisture drainage port;
a valve body comprised of a valve stem received in the valve guide and a head disposed on an exterior side of the light fixture case sidewall;
a counterweight carried by the valve body and disposed on an interior side of the light fixture case sidewall opposite the valve head; and
wherein changing orientation of the light fixture relative to gravity displaces the valve body toward one of a closed position where the valve head seats against the valve seat blocking the moisture drainage port formed by the valve guide preventing moisture from flowing therethrough and an open position disposed from the closed position where the valve head is spaced from the valve seat unblocking the moisture drainage port formed by the valve guide allowing moisture to flow therethrough.

20. The valve assembly of claim 19 wherein the counterweight is slidably carried by the valve stem and movable relative thereto during displacement of the valve body toward at least one of an open position and the closed position.

21. A light fixture moisture release valve assembly comprising:
a light fixture having a light fixture case with an exteriorly disposed valve seat integrally formed of a portion of a sidewall of the light fixture case and an interiorly disposed recessed fluid-accumulating well opposite the seat integrally formed of the portion of the sidewall of the light fixture case with the valve seat having a valve guide therein that extends completely through the sidewall defining a moisture drainage port in fluid-flow communication with the fluid-accumulating well;
a valve body comprised of a valve stem received in the valve guide and a head disposed on an exterior side of the light fixture case sidewall; and
wherein changing orientation of the light fixture relative to gravity displaces the valve body toward one of a closed position where the valve head seats against the valve seat and an open position disposed from the closed position where the valve head is spaced from the valve seat.

22. The valve assembly of claim 21 further comprising a counterweight carried by the valve body and disposed on an interior side of the light fixture case sidewall opposite the valve head.

* * * * *